United States Patent
Lim et al.

(10) Patent No.: US 11,460,855 B1
(45) Date of Patent: Oct. 4, 2022

(54) SYSTEMS AND METHODS FOR SENSOR CALIBRATION

(71) Applicant: Direct Current Capital LLC, Wilmington, DE (US)

(72) Inventors: Ying Yi Lim, Mountain View, CA (US); Sasawat Prankprakma, Mountain View, CA (US)

(*) Notice: Subject to any disclaimer, the term of this patent is extended or adjusted under 35 U.S.C. 154(b) by 0 days.

(21) Appl. No.: 16/834,974

(22) Filed: Mar. 30, 2020

Related U.S. Application Data

(60) Provisional application No. 62/826,959, filed on Mar. 29, 2019.

(51) Int. Cl.
  *G05D 1/02* (2020.01)
(52) U.S. Cl.
  CPC ......... *G05D 1/0246* (2013.01); *G05D 1/0242* (2013.01)
(58) Field of Classification Search
  CPC .................... G05D 1/0246; G05D 1/0242
  See application file for complete search history.

(56) References Cited

U.S. PATENT DOCUMENTS

| | | | |
|---|---|---|---|
| 7,840,355 B2 | 11/2010 | Breed et al. | |
| 8,194,998 B2 | 6/2012 | Saito | |
| 8,311,343 B2 | 11/2012 | Chung | |
| 8,488,877 B1 | 7/2013 | Owechko et al. | |
| 8,731,816 B2 | 5/2014 | Dintzer et al. | |
| 8,907,771 B2 | 12/2014 | Vasquez et al. | |
| 10,854,011 B2 | 12/2020 | Tay et al. | |
| 2008/0319670 A1 | 12/2008 | Yopp et al. | |
| 2010/0209013 A1* | 8/2010 | Minear | G06T 7/32 382/260 |
| 2011/0098890 A1 | 4/2011 | Lundmark et al. | |
| 2011/0286628 A1 | 11/2011 | Goncalves et al. | |
| 2012/0027255 A1 | 2/2012 | Endo | |
| 2012/0158250 A1 | 6/2012 | Stiegler | |
| 2014/0032093 A1 | 1/2014 | Mills | |
| 2014/0035777 A1 | 2/2014 | Kim et al. | |
| 2014/0343750 A1 | 11/2014 | Minemura et al. | |

(Continued)

OTHER PUBLICATIONS

Ohn-Bar et al., U.S. Appl. No. 15/271,702, filed Sep. 21, 2016.

(Continued)

*Primary Examiner* — Ramsey Refai
(74) *Attorney, Agent, or Firm* — Polsinelli PC

(57) ABSTRACT

Implementations described and claimed herein provide systems and methods for sensor calibration. In one implementation, an image and a depth map of a field around a mobile device are obtained. The image is captured using a first sensor, and the depth map is captured using a second sensor. A position and a reflected radiation intensity of a calibration surface are detected in the field using the depth map. A first portion and a second portion of the calibration surface representing a background color and a foreground color are isolated based on the reflected radiation intensity. The calibration surface is detected in the image using the position of the calibration surface in the depth map and a calibration transform between the first sensor and the second sensor. The calibration transform is optimized based on an overlap of the foreground color and/or the background color between the depth map and the image.

20 Claims, 7 Drawing Sheets

(56) References Cited

U.S. PATENT DOCUMENTS

| | | |
|---|---|---|
| 2015/0009010 A1 | 1/2015 | Biemer |
| 2015/0294192 A1 | 10/2015 | Lan et al. |
| 2019/0026956 A1* | 1/2019 | Gausebeck ............. G06T 19/20 |
| 2019/0108396 A1 | 4/2019 | Dal Mutto et al. |
| 2019/0120947 A1* | 4/2019 | Wheeler .............. H04N 5/2329 |
| 2019/0287254 A1 | 9/2019 | Lakshmi Narayanan et al. |
| 2019/0291723 A1 | 9/2019 | Srivatsa et al. |
| 2019/0311546 A1 | 10/2019 | Tay et al. |
| 2019/0362178 A1 | 11/2019 | Huang et al. |
| 2020/0349742 A1 | 11/2020 | Wang et al. |

OTHER PUBLICATIONS

Ohn-Bar et al., U.S. Appl. No. 15/271,704, filed Sep. 21, 2016.
Song et al., U.S. Appl. No. 16/587,942, filed Sep. 30, 2019.
Foster, U.S. Appl. No. 16/781,165, filed Feb. 4, 2020.

\* cited by examiner

SYSTEMS AND METHODS FOR SENSOR CALIBRATION

CROSS-REFERENCE TO RELATED APPLICATIONS

The present application claims priority to U.S. Provisional Application No. 62/826,959, entitled "Method for Calibrating a 2D Camera and a 3D Depth Sensor" and filed on Mar. 29, 2019, which is specifically incorporated by reference herein in its entirety.

FIELD

Aspects of the present disclosure relate to systems and methods for perceiving a field of view around a mobile device and more particularly to calibrating a two-dimensional image sensor and a three-dimensional image sensor for perceiving a field of view around a mobile device.

BACKGROUND

Mobile devices, such as autonomous vehicles, autonomous machines, personal computing devices, and/or the like, often capture images of a field of view around the mobile device to interact with, navigate around, or otherwise understand objects within the field of view. Many such mobile devices utilize a plurality of sensors in a sensor system to perceive the field of view around the mobile device. Each of the sensors may capture different image information at varying levels of resolution, detail, depth, speed, wavelength, and/or the like to enable the sensor system to perceive as much of the field of view as possible, while balancing time and accuracy. Perception of the field of view may be based on a composite image generated from the different image information or based on a selection of image information from one sensor over another sensor. During operation of the mobile device, the sensors may become offset from each other or otherwise capture image information that is unaligned. Calibrating sensors of the mobile device to ensure accuracy and consistency is challenging, particularly when the mobile device is in operation. On the other hand, without calibrated sensors, it is challenging for the mobile device to identify objects and their respective movements within the field of view, particularly with sufficient speed and accuracy to autonomously determine actions, such as navigational actions, in view of the objects within the field of view. It is with these observations in mind, among others, that various aspects of the present disclosure were conceived and developed.

SUMMARY

Implementations described and claimed herein address the foregoing problems by providing systems and methods for sensor calibration. In one implementation, an image of a field around a mobile device is obtained. A depth map of the field around the mobile device is obtained. The image is captured using a first sensor, and the depth map is captured using a second sensor. A position and a reflected radiation intensity of a calibration surface are detected in the field using the depth map. A first portion of the calibration surface representing a background color is isolated based on the reflected radiation intensity. A second portion of the calibration surface representing a foreground color is isolated based on the reflected radiation intensity. The calibration surface is detected in the image using the position of the calibration surface in the depth map and a calibration transform between the first sensor and the second sensor. The calibration transform between the first sensor and the second sensor is optimized based on an overlap of at least one of the foreground color or the background color between the depth map and the image.

Other implementations are also described and recited herein. Further, while multiple implementations are disclosed, still other implementations of the presently disclosed technology will become apparent to those skilled in the art from the following detailed description, which shows and describes illustrative implementations of the presently disclosed technology. As will be realized, the presently disclosed technology is capable of modifications in various aspects, all without departing from the spirit and scope of the presently disclosed technology. Accordingly, the drawings and detailed description are to be regarded as illustrative in nature and not limiting.

DETAILED DESCRIPTION

Aspects of the presently disclosed technology relate to systems and methods for calibrating sensors of a mobile device, such as an autonomous machine, an autonomous vehicle, a personal computing device, and/or the like and perceiving a field around the mobile device. In one aspect, during a scan cycle, a two-dimensional (2D) color image and a three-dimensional (3D) depth map of a field around a mobile device are recorded using a first sensor and a second sensor, respectively. A subset of points in a cluster of points that intersect a surface plane in the 3D depth map of field are isolated. The subset of points represent a background color on this calibration surface. Another subset of points representing a foreground color is similarly isolated. Based on positions of these subsets of points, the calibration surface is detected in the 2D color image, and the edges between the foreground and background colors are determined. Based on the relationship of the edges, a calibration transform between the 2D camera and the 3D depth sensor is determined. The calibration transform may be optimized at various times during operation of the mobile device to calibrate a relationship between the first and second sensors.

In some aspects, a composite image may be generated from the 2D image and the 3D depth map using the calibration transform. The composite images may be used for object identification and tracking, determining object extent (e.g., size, geometry etc.), differentiating and tracking multiple objects simultaneously, autonomously navigating through the field of view around the mobile device, and/or the like.

The various systems and methods disclosed herein generally provide for sensor calibration during operation of a mobile device and for perceiving objects in a field of view around the mobile device faster, with high accuracy, and less computational burden. Example implementations discussed herein reference sensor calibration for an autonomous vehicle, perceiving objects in a field of view around the autonomous vehicle using calibrated sensors, identifying and tracking various objects in the field of view, generating a motion plan for autonomously navigating through the field of view, and/or the like. However, it will be appreciated by those skilled in the art that the presently disclosed technology is applicable to other manned and unmanned autonomous machines, including, without limitation, terrestrial vehicles, aerial vehicles, aerospace vehicles, submersible vehicles, and/or the like, as well as other mobile devices, such as smartphones, tablet, personal computers, robotics, mobile computing devices, and/or the like.

Figure 1:
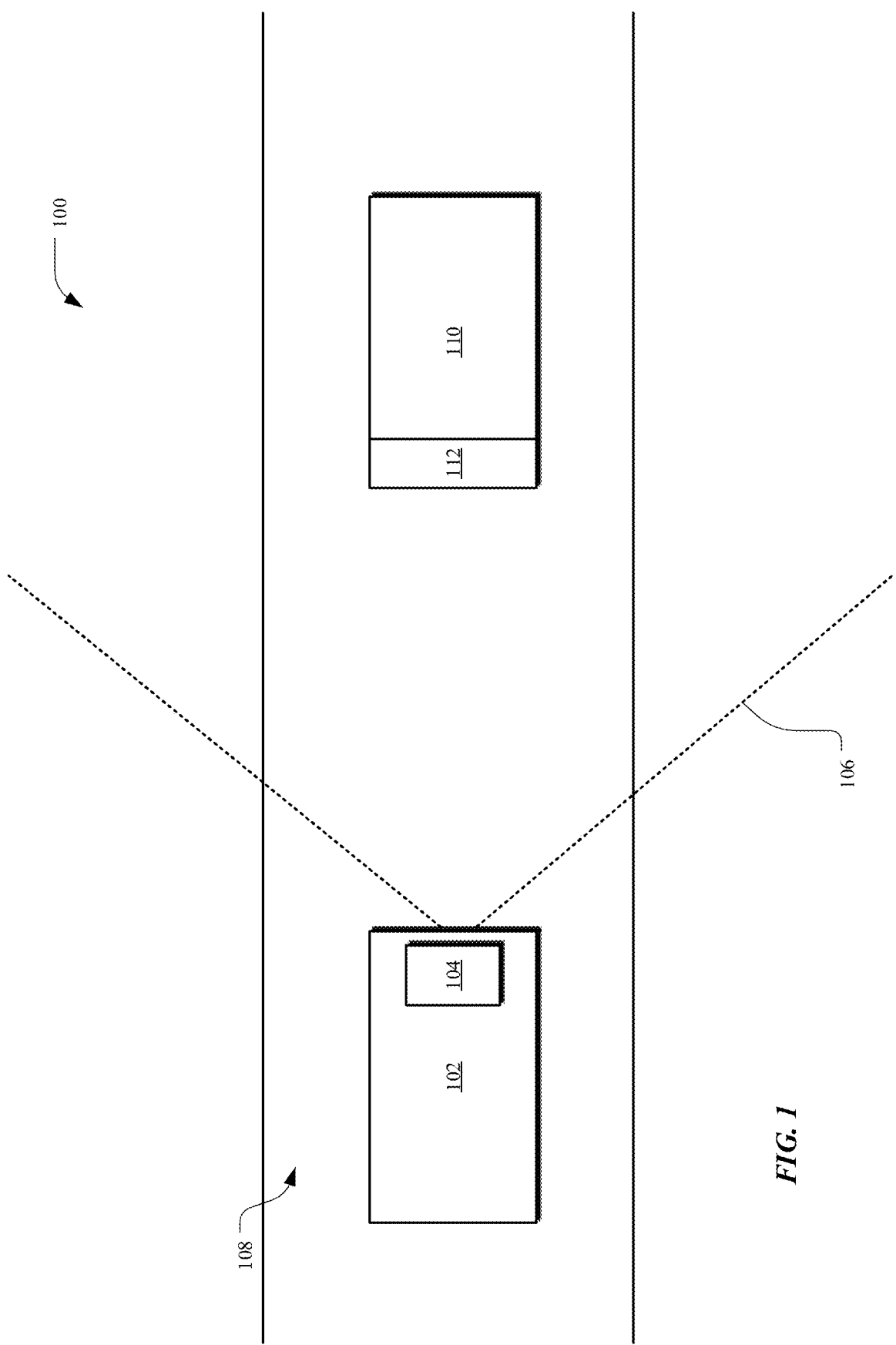
FIG. 1 illustrates an example environment for sensor calibration for perceiving a field of view around a mobile device.

For a detailed description of an example environment 100 for sensor calibration of a sensor system 104 of an autonomous vehicle 102, reference is made to FIG. 1. In one implementation, the sensor system 104 includes one or more sensors perceiving a field of view 106 around the autonomous vehicle 102 as it travels along a travel path 108 of a route. While FIG. 1 illustrates the field of view 106 as being generally in front of the autonomous vehicle 102 as it travels along the travel path 108, it will be appreciated that the field of view 106 may be all or any portion of the 360 degree area around the autonomous vehicle 102. Various objects (e.g., object(s) 110), which may be mobile objects and/or stationary objects, may be located within the field of view 106.

Generally, the autonomous vehicle 102 is autonomously navigating along a route and moving on the travel path 108 along the route. The autonomous vehicle 102 is capable of operating to move along the travel path 108 with limited input from occupants within an interior of the autonomous vehicle 102. Stated differently, rather than the user having an operational engagement with the autonomous vehicle 102 to control its actions, the occupant may simply input a destination point or other instruction and the autonomous vehicle 102 transports the occupant through a series of autonomous decisions. As a result, depending on their nature and movement, objects, including mobile, stationary, and/or traffic objects in the scene 106 may or may not impact the actions being executed by the autonomous vehicle 102 as it navigates through the scene 106. Thus, the autonomous vehicle 102 regularly optimizes calibration of the one or more sensors in the sensory system 104 to generate a perception of the scene 106, from which a motion plan may be generated for autonomously navigating the autonomous vehicle 102 through the field 106.

In one implementation, the sensor system 104 includes a first sensor and a second sensor. During operation of the autonomous vehicle 102, the sensor system 104 regularly scans the field of view 106 through a series of scan cycles. In connection with a scan cycle, the sensor system 104 records a 2D image (e.g., a color image) of the scene 106 via the first sensor and records a 3D depth map of the field 106 via the second sensor. The autonomous vehicle 102 detects a cluster of points in the 3D depth map approximately intersecting a plane defined by a surface 112 of the object(s) 110 in the field 106. The surface 112 may be identified and used as a calibration surface, as described herein.

In one implementation, the autonomous vehicle 102 isolates a first subset of points in the cluster of points. The first subset of points may represent a background color on the surface 112 and contain intensity values within a first range. The autonomous vehicle 102 further isolates a second subset of points in the cluster of points, representing a foreground color on the surface 112, with the second subset of points containing intensity values within a second range different from the first range.

With respect to the image information for the first sensor of the sensor system 104, the autonomous vehicle 102 detects the surface 112 in the 2D image based on a position of the cluster of points in the 3D depth map and a stored calibration transform for the first and second sensors of the sensor system 104. The autonomous vehicle 102 isolates an edge between the background color and the foreground color in the 2D image. In one implementation, to optimize the calibration transform, the autonomous vehicle 102 projects the first set of points in the cluster of points in the 3D depth map outside of the edge between the background color and the foreground color and projects the second set of points in the cluster of points in the 3D depth map inside of the edge between the background color and the foreground color. Based on the relationship of the foreground color and/or the background color between the 2D image and the 3D depth map, the calibration transform is recalibrated, adjusted, validated, or otherwise optimized.

Using the calibration transform, the 2D image, the 3D depth map, and/or other images (e.g., a sequence of consecutive individual images) may be merged into a composite image. The composite image or any of the underlying images, alone or in various combinations, may be processed to identify types, classes, sizes, geometries, and/or other descriptors of objects in the field 106 around the autonomous vehicle 102 and to predict trajectories or motion of these objects with relatively high accuracy. Based on this object detection, identification, and tracking, a motion plan for navigating the autonomous vehicle 102 through the field 106 may be generated and autonomously executed by the autonomous vehicle 102.

Figure 2:
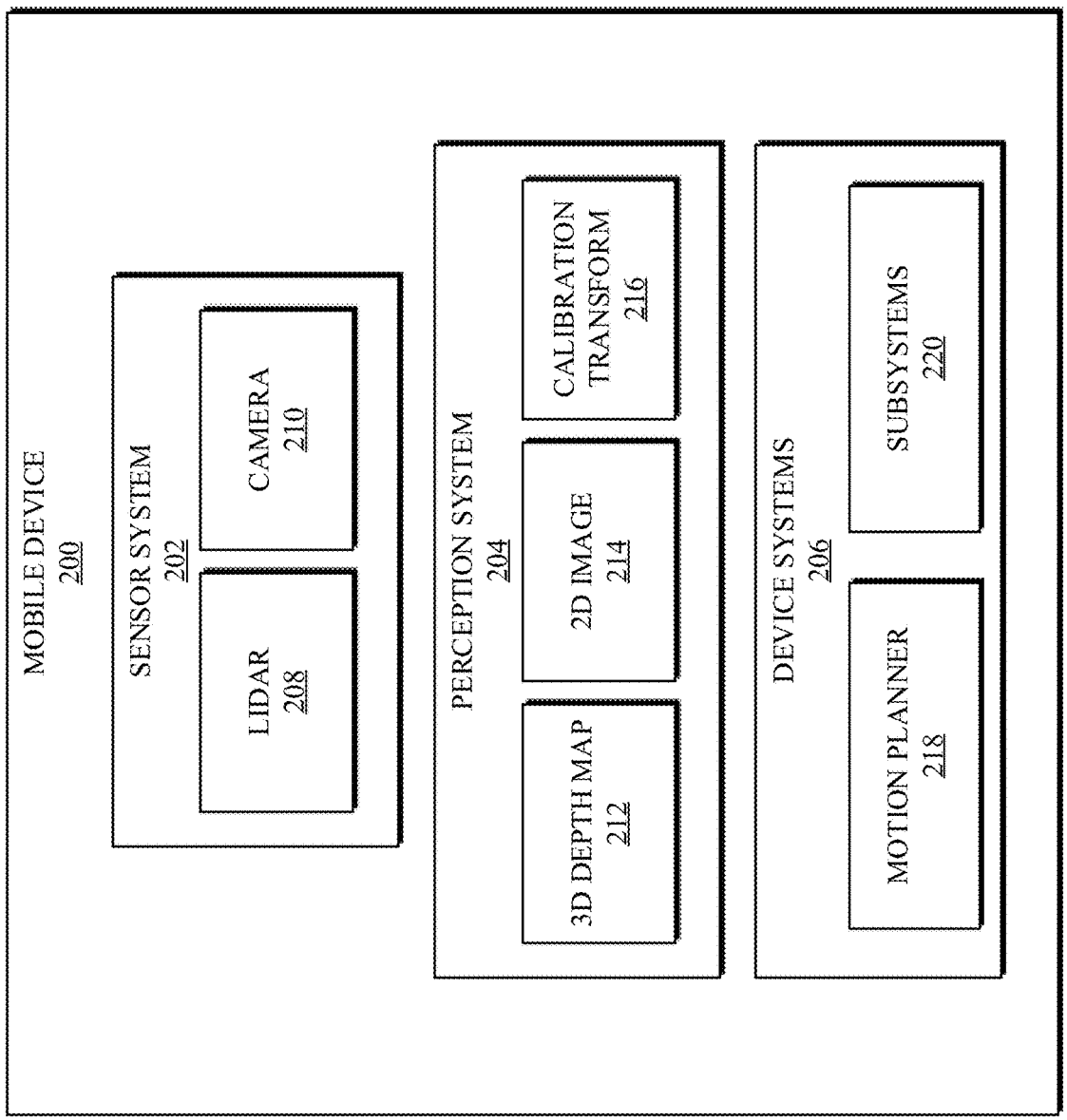
FIG. 2 is a block diagram of an example mobile device.

Turning to FIG. 2, an example mobile device 200, which may be the autonomous vehicle 102, a smartphone, a personal computing device, or another, static or moving platform or robotics platform, is shown. In one implementation, the mobile device 200 includes a sensor system 202, a perception system 204, and device systems 206. The sensor system 202 includes one or more sensors to capture perception data of the field of view 106, such as one or more images. The sensor system 202 may include one or more first sensors and one or more second sensors. The one or more first sensors may be 3D sensors configured to capture 3D images, and the one or more second sensors may be 2D sensors configured to capture 2D images. In one implementation, the 3D sensors include one or more LIDAR sensors 208 (e.g., scanning LIDAR sensors) or other depth sensors, and the 2D sensors include one or more cameras 210 (e.g., RGB cameras). The cameras 210 may capture color images, grayscale images, or other 2D images. It will be appreciated as well that other sensors, such as RADAR, IR, and/or the like may be similarly deployed in the sensor system 200 and calibrated according to the presently disclosed technology.

In one implementation, the LIDAR sensor 208 captures a first image in the form of a 3D depth map 212 of a field around the mobile device 200, and the camera 210 captures a second image in the form of a 2D image 214 of the field. The perception system 204 spatially calibrates the LIDAR sensor 208 and the camera 210 using a calibration transform 216. The calibration transform 216 is optimized by detecting an edge between a background portion and a foreground portion of a calibration surface in the 3D depth map 212 and comparing the edge to a corresponding edge between the foreground portion and the background portion in the 2D image 214. The edge between the foreground portion and the background portion of the calibration surface in the 3D depth map 212 may be detected based on a light intensity values of a cluster of points, as described herein.

Using the calibration transform 216, in one implementation, the perception system 204 generates a composite image. Using the composite image, the perception system 204 may detect, identify, classify, and track one or more objects simultaneously in the field of view 104. Further, the composite image, the 3D depth map 212, the 2D image 214, and/or object tracking data may be utilized by the device systems 206 for autonomous decisions, navigation, and/or other actions. For example, the composite image may be used by a motion planner 218 in generating one or more actions for the mobile device 200, such as generating a motion plan having at least one navigational action for autonomously navigating the autonomous vehicle 102 through the field 106 in view of objects. The motion plan may include various operational instructions for subsystems 220 of the autonomous vehicle 102 to autonomously execute to perform the navigational action(s), as well as other action(s).

Figure 3:
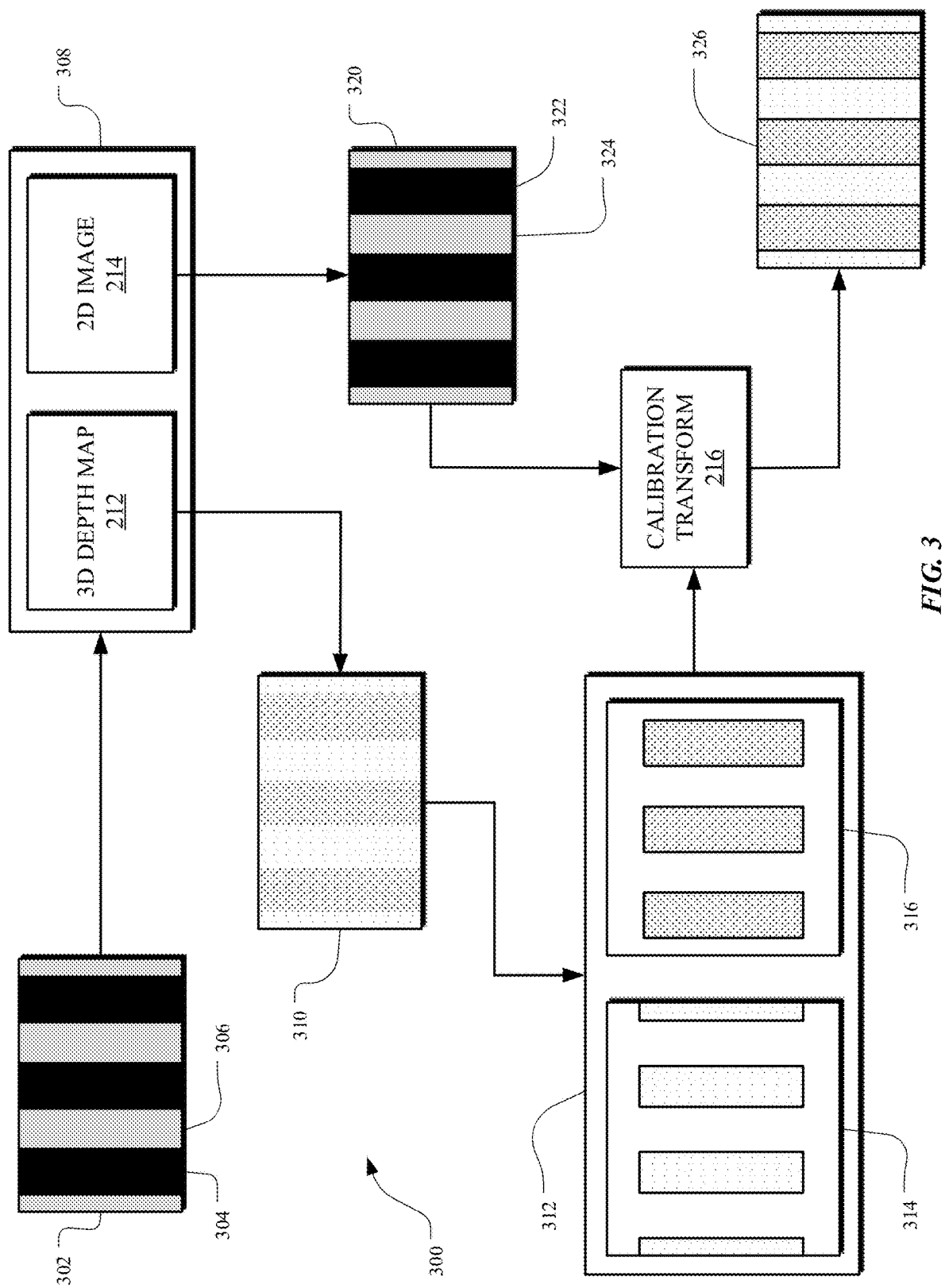
FIG. 3 is a diagram illustrating calibration of a two-dimensional sensor and a three-dimensional sensor of a mobile device.

Turning to FIG. 3, a diagram 300 illustrating calibration of a first sensor (e.g., the LIDAR sensor 208) and a second sensor (e.g., the camera 210) of the mobile device 200 is shown. In one implementation, a calibration surface 302, such as the surface 112, is present in images 308 captured by the first sensor and the second sensor, such as the 3D depth map 212 and the 2D image 214. The calibration surface 302 is a generally planar surface that includes a foreground color 304 and a background color 306.

In one implementation, the 3D depth map 212 includes a point cloud, with each point in the point cloud representing a point-surface in the field 106. Each point is further associated with a light intensity value representative of at least one of a color, texture, or reflectivity of the point-surface. The calibration surface 302 may be detected in the point cloud by detecting a cluster of points 310 in the 3D depth map 212 corresponding to a plane in a depth domain. A position and a reflected radiation intensity of the calibration surface 302 are detected.

A first portion of the calibration surface 302 representing the background color 306 and a second portion representing the foreground color 304 are each isolated based on the reflected radiation intensity. In one implementation, the foreground color 304 of the calibration surface 302 and the background color 306 of the calibration surface 302 are isolated by aggregating the cluster of points 310 into a plurality of groups 312. More particularly, the cluster of points 310 may be aggregated into a first subset of points 314 and a second subset of points 316 in the depth domain based on the light intensity values. The first subset of points 214 corresponds to a first light intensity range, and the second subset of points 316 corresponds to a second light intensity range, with the first subset of points 314 representing the background color 306 and the second subset of points 316 representing the foreground color 304.

The 2D image 214 includes a color domain image 320 in the color domain having a first color 322 and a second color 324. To detect the image 320 in the 2D image 214 as corresponding to the calibration surface 302, the position of the calibration surface 302 in the 3D depth map 212 and the calibration transform 216 between the sensors 208-210 are used. In one implementation, to detect the calibration surface 302 in the 2D image 214, a boundary of the cluster of points 310 are projected from the 3D depth map 212 into the 2D image 214. The calibration surface 302 is isolated in the 2D image 214 as the color domain image 320 by scanning a region of the 2D image 214 around the boundary in the 2D image 214. An edge between the first color 322 and the second color 324 is detected in the color domain image 320, with the first color 322 corresponding to the foreground color 304 and the second color 324 corresponding to the background color 306.

Based on a relationship 326 between the color domain image 320 and the depth domain through the first subset of points 314 and the second subset of points 316, the calibration transform 216 may be optimized. The relationship 326 may include an overlap of the foreground color 304 and/or the background color 306 between the depth domain of the 3D depth map 212 and the color domain of the 2D image 214. In one implementation, to optimize the calibration transform 216, the first subset of points 314 is projected in the color domain image 320 outside of an edge between the background color 324 and the foreground color 322 based on the calibration transform 216, and the second subset of points 316 is projected in the color domain image 320 inside of the edge between the background color 324 and the foreground color 322 based on the calibration transform 216. Based on the projection, the relationship 326 includes a contiguous boundary isolated around the foreground color 304 in the color domain or otherwise in the 2D image 214. The calibration transform 216 may be optimized to project all points in the first subset of points 314 inside the contiguous boundary in the color domain and no points in the second subset of points 316 inside the contiguous boundary in the color domain. Alternatively or additionally, the calibration transform 216 may be optimized to project the contiguous boundary from the color domain into the depth domain, such that the contiguous boundary projected in the 3D depth map 212 contains all points in the first subset of points 314 and excludes all points in the second subset of points 316.

For a more detailed description of an example implementation of the systems and methods for sensor calibration, reference is made to FIGS. 1-3. As described herein, the presently disclosed technology may be executed by the autonomous vehicle 102 to spatially calibrate a 3D depth sensor (e.g., the LIDAR sensor 208) and a 2D sensor (e.g., the camera 210) arranged on the autonomous vehicle 102 in real-time during operation of the autonomous vehicle 102. In one implementation, the autonomous vehicle 102 can leverage the 3D depth maps 212 that store both positions and reflected radiation intensities of surfaces in the field 106 near the autonomous vehicle 102 to discern foreground text, iconography, or other graphics on a substantially planar surface 110 in the field 106 and to calibrate the LIDAR sensor 208 to the camera 210 by aligning foregoing content in the 3D depth map 212 with similar foreground features detected in the 2D image 214 and/or by aligning background content in the 3D depth map 212 with similar background features detected in the 2D image 214.

In one implementation, the autonomous vehicle 102 records a 2D color image 214 of the field 106 near the autonomous vehicle 102 via the camera 210 and a concurrent 3D depth map 212 (e.g., a 3D LIDAR point cloud) of the field 106 via the LIDAR sensor 208. Stated differently, the 3D depth map 212 can include a point cloud in which each point represents a point-surface in the field 106 around the autonomous vehicle 102 and is annotated with a light intensity value of a surface in the field represented by this point. The light intensity value stored in a point may be representative of a color, texture, and/or reflectivity of the corresponding point-surface. The autonomous vehicle 102 detects the calibration surface 302 represented by the cluster of points 310 in the 3D depth map 212 that fall on or near a plane. The perception system 204 aggregates points in the cluster 310 into the plurality of groups 213 based on light intensity values stored in the points. The second set of points 316 that represent the foreground color 304 (e.g., text, iconography, graphics, or other content represented by light intensity values that fall within a first light intensity range) from the first set of points 314 that represent the background color 306 (e.g., a background color or background texture represented by light intensity values that fall within a different light intensity range) on the calibration surface 302. Therefore, the autonomous vehicle 102 can detect the cluster of points 310 that define the calibration surface 302 approximating a plane in a depth domain and segment the calibration surface 302 by light intensity to delineate a boundary between foreground and background content (referred to herein as the foreground color 304 and the background color 306) on the calibration surface 302 in an intensity domain.

The autonomous vehicle 102 leverages the calibration transform 216 for the sensors 208-210 to project a boundary of the calibration surface 302 (e.g., a boundary that contains the cluster of points 310) from the 3D depth map 212 onto the concurrent color image 214. The perception system 204 scans a region of the color image 214 around the projected boundary to isolate the calibration surface 302 in the color image 214 as the color domain image 320. Edge detection or other computer vision techniques may be utilized to detect a boundary in the color domain between the foreground content 322 and the background content 324 on the calibration surface 302.

In one implementation, the calibration transform 216 may be optimized by projecting all points 316 in the cluster 310 that correspond to foreground content 304 on the calibration surface 302 inside the boundary in the color domain image 320 and projecting all points 314 in the cluster 310 that correspond to background content 306 on the calibration surface 302 inside the calibration surface 302 but outside of the boundary around the foreground content 306 in the color domain image 302, thereby providing the relationship 326 as a 2D image with a contiguous boundary. In particular, because the 2D color image may depict a contiguous boundary around the foreground content 304 at a resolution (significantly) greater that the 3D depth map 212, the autonomous vehicle 102 may isolate the contiguous boundary around the foreground content 322 from the color domain image 320.

The perception system 204 may calculate, refine, or otherwise optimize the calibration transform 216 that projects all points 316 in the 3D depth map 212 predicted to represent this foreground content 304 (i.e., based on intensity value stored in these points) inside the boundary in the color domain image 320 and project no points from the points 314 in the 3D depth map 212 predicted to represent background content 306 inside this boundary in the color domain image 320, as illustrated in the relationship 326. In another implementation, the perception system 204 extracts the contiguous boundary around the foreground content 322 from the color domain image 320 and optimizes the calibration transform 216 that projects the boundary from the color domain image 320 into the depth domain, such that the projected boundary contains all points 316 in the 3D depth map 212 predicted to represent the foreground content 304 and excludes all points from the points 314 in the 3D depth map 212 predicted to represent the background content 306.

It will be appreciated that the perception system 204 may optimize the calibration sensor 216 for multiple unique boundaries or edges between the background content 306 and different foreground content 304 on the calibration surface 302 and/or for boundaries or edges between background content and foreground content on multiple discrete calibration surfaces depicted in the 3D depth map 212 and 2D color image 214. In such cases, the perception system 204 calculates the calibration transform 216 between the 3D depth sensor 208 and the color camera 210 based on a set of boundaries or edges depicted in the 3D depth map 212 and the concurrent 2D color image 214.

In one implementation, the calibration transform 216 may be optimized in the depth and color domains using an identical edge. As described herein, the surface 110 in the field 106, which may be, without limitation, a road sign, a billboard, a tractor trailer, a building façade, a road surface, and/or other surfaces may be used as the calibration surface 302, where the surface 110 is approximately planar and has text, iconography, graphics, and/or other foreground features that exhibits different colors, textures, and/or reflectivity than the background features fall on approximately the same plane.

The perception system 204 detects an edge between the background content 306 and the foreground content 304 on the single approximately planar surface of the calibration surface 302 in the 3D depth map 212 based on light intensities stored in points in the 3D depth map 212. The perception system 204 isolates the same edge in the concurrent 2D color image 214, such that the perception system 204 compares these edges in the depth and color domains directly to optimize the calibration transform 216 between the 3D depth sensor 208 and the color camera 210 with minimized error that may be caused, for example, by perspective differences resulting from a physical offset between the 3D depth sensor 208 and the color camera 210. In one implementation, before the perception system 204 isolates an edge between the foreground content 304 and the background content 306 on the calibration surface 302 in both the 3D depth map 212 and the concurrent color image 214, the edge selected by the perception system 204 in the depth domain may represent the same edge selected by the perception system 204 in the color domain despite a non-zero offset distance between the sensors 208 and 210.

Because the perception system 204 isolates an edge in the calibration surface 302 in both the 3D depth map 212 and the concurrent color image 214 that persists in real space regardless of perspective relative to the calibration surface 302 and calculates the calibration transform 216 that aligns this edge in the depth and color domains, the perception system 204 can spatially calibrate the sensors 208 and 210 both accurately and regularly independent of the positions of the sensors 208 and 210 on the autonomous vehicle 102. For example, the sensors 208 and 210 may be spatially calibrated even if the 3D depth sensor 208 is substantially offset in translation and/or rotation from the 2D color camera 210. Therefore, the perception system 204 may minimize or eliminate error in the calibration transform 216 between the 3D depth sensor 208 and the color camera 210 that may otherwise occur due to a non-zero offset between the sensors 208 and 210.

As described herein, the mobile device 200 may be the autonomous vehicle 102 for calibrating the sensor system 104 or any mobile computer system to spatially calibrate a plurality of sensors, such as the 3D depth sensor 208 and the 2D color camera 210. It will be appreciated that the presently disclosed technology may also be applicable to any fixed computer system to spatially calibrate sensors. Further, any number and/or type of sensors may be included. The camera 210 may include 2D grayscale cameras that are spatially calibrated with the 3D depth sensor 212 based on light intensities stored in points in the 3D depth map 212 and grayscale values stored in pixels in a 2D grayscale image. Similarly, the 2D color image 214 may be converted to grayscale to calibrate the 3D depth sensor 208 and the 2D color camera 210 based on light intensities stored in points in the 3D depth map 212 and grayscale values stored in pixels in the 2D grayscale image.

Further, the sensor system 202 may obtain image information data in the depth domain and the color domain in various manners for calibrating the 3D sensor 208 and the 2D sensor 210. In one implementation, during a scan cycle, the sensor system 200 records the 3D depth map 212 (also referred to herein as a "LIDAR point cloud") from the 3D depth sensor 208 (as referred to herein as a "LIDAR sensor") and records the 2D image 214 (as referred to herein as a "color image") from the 2D sensor 210 (also referred to herein as a "camera"). The sensors 208 and 210 may be arranged on the autonomous vehicle 102 in various configurations, such as adjacent or remotely from each other and defining a field of view that at least partially overlaps the field of view each other.

Generally, the autonomous vehicle 102 generally includes: the sensor system 200 configured to collect information about the environment around the autonomous vehicle 102; local memory storing a navigation map defining lane connections and nominal vehicle paths for a road area and a localization map that the autonomous vehicle 102 implements to determine its location and orientation in real space; and the device systems 220 that govern actuators within the autonomous vehicle 102 to execute various functions based on the navigation map, the localization map, and outputs of the perception system 204.

To capture the 3D depth map 212, the LIDAR sensors 208 may include a set of spinning LIDAR sensors arranged on the autonomous vehicle 102, such as one LIDAR sensor mounted at each corner of the autonomous vehicle 102 or a set of LIDAR sensors integrated into a roof rack mounted to the roof of the autonomous vehicle 102. Similarly, in one implementation, the cameras 210 includes one or more 2D color cameras, such as grayscale or RGB cameras, which may be arranged on the roof of or otherwise deployed in the autonomous vehicle 102. The cameras 210 may be located in multiple orientations about the autonomous vehicle 102 (e.g., facing the front, front corners, sides, and rear of the autonomous vehicle 102, etc.), and each camera 210 may define a field of view that overlaps the field of view of at least one LIDAR sensor 208 on the autonomous vehicle 102. It will be appreciated, however, that the sensor system 200 can include one or more 3D depth sensors or 2D image sensors of any other type or configuration.

Each LIDAR sensor 208 can output the 3D LIDAR point cloud 212, such as in the form of a 3D point cloud representing distances between the LIDAR sensor 208 and external surfaces within the field of view of the LIDAR sensor 208, per rotation of the LIDAR sensor 208 (i.e., once per scan cycle). For example, each LIDAR sensor 208 can include a stack of pixels (e.g., 16 or 32 pixels arranged in a linear vertical array) mounted on a motorized rotary table. During a scan cycle, the LIDAR sensor 208 rotates the stack of pixels and records a distance value from each pixel in the stack at each of many (e.g., 1000 or 4500) points per rotation to produce the LIDAR point cloud 212 containing a 3D point cloud characterized by a relatively high azimuthal resolution (e.g., 0.3° or 0.08°) and a lower vertical resolution (e.g., 1.7° or 0.8°). Furthermore, because the LIDAR sensor 208 sweeps a column of pixels about its rotational axis, the LIDAR sensor 208 may represent an object near the autonomous vehicle 102 in the field of view 106 of the LIDAR sensor 208 as rows of points in the LIDAR point cloud 212. In particular, a large object nearer the autonomous vehicle 102 may be represented by a larger number of rows, each containing a larger number of points, in the LIDAR point cloud 212. Similarly, a smaller object or one located further from the autonomous vehicle 102 may be represented by a smaller number of rows, each containing fewer points, in the LIDAR point cloud 212.

In one implementation, the LIDAR sensor 208 annotates or labels points in the LIDAR point cloud 212 with intensities of light reflected or emitted from corresponding surface in the field when scanned by pixels in the LIDAR sensor 208. For example, to generate the LIDAR point cloud 212, the LIDAR sensor 208 can rotate a column of light emitters and pixels to a first azimuthal position. The light emitters project beams of light (e.g., infrared light, laser beams) to illuminate small, discrete surfaces in the field 106, and the column of pixels detects both timing and intensity of light reflected from the illuminated surfaces back toward the LIDAR sensor 208. Distances between the LIDAR sensor 208 and to these surfaces may be interpreted based on receipt times of these reflected light signals. The LIDAR sensor 208 may repeat this process for subsequent azimuthal positions in one rotation of the column of light emitters and pixels and compile distances derived from data collected during the rotation of the column of light emitters and pixels into the 3D point cloud 212 representing positions of surfaces around the LIDAR sensor 208 during the rotation. Each point may be annotated with a light intensity detected by the correspond pixel at the corresponding azimuthal position. The LIDAR sensor 208 may further repeat this process for each complete rotation of the column of light emitters and pixels and thus generate the LIDAR point cloud 212 in the form of an intensity-annotated point cloud, per rotation.

During operation, the LIDAR sensors 208 can output the LIDAR point clouds 212 at a regular sampling rate, such as at a rate of 10 Hz. The camera(s) 210 can similarly regularly output the color images 214, such as at a rate of 24 Hz. During a scan cycle, the perception system 204 may select a last LIDAR point cloud 212 output by the LIDAR sensor 208 and a color image 214 recently output by the camera 210 defining a field of view intersecting the field of view of the LIDAR sensor at a time nearest the record time of the LIDAR point cloud 212.

As described herein, the sensors 208 and 210 may be spatially calibrated by optimizing the calibration transform 216 for a set of approximately concurrent LIDAR image 212 and color image 214 output by the LIDAR sensor 208 and the camera 210, respectively, during a calibration routine. The calibration routine may be triggered automatically by a variety of triggers and/or manually. For example, in one implementation, optimization of the calibration transform 216 may be triggered according to a schedule, such as once per hour of operation or once per route (e.g., between turning on and off the engine, between a selected origin and a selected designation, etc.) of the autonomous vehicle 102, or on a regular interval, such as once per ten-second interval or once per 200 LIDAR point clouds output by the LIDAR sensor 208 operating a rate of 20 Hz.

In one implementation, the calibration transform 216 may be optimized opportunistically, for example, when planar surfaces 110 with foreground/background features that may serve as the calibration surface 302 are detected or known to be present nearby. Such opportunistic triggers may include, without limitation, detecting: graphics on a planar wall surface; iconography (e.g., a business sign, graffiti) on a planar building façade; graphics on a planar side of a truck or other vehicle; graphics on a billboard, road sign, or bus stop; and/or the like. Opportunistic triggers may occur when the autonomous vehicle 102 is parked at a known location, stopped at an intersection, traveling along the route 108; and/or before, during, or after operation.

The calibration transform 216 may further be optimized in response to an event that may affect calibration of the LIDAR sensor 208 and the color camera 210. The event may include, without limitation: when the autonomous vehicle 102 detects a large acceleration or deceleration; when an impact (e.g., an accident) is detected; when the autonomous vehicle 102 passes over a road obstacle, such as a large pothole; when an output of an accelerometer, inertial measurement unit, or other subsystem in the autonomous vehicle 102 exceeds a threshold acceleration value; and/or the like. It will be appreciated that the calibration transform 216 may be optimized responsive to any time, distance, location, and/or other event to minimize alignment error between analogous edges of calibration surfaces 302 selected in concurrent LIDAR and color images 208 and 210. Further, the trigger may be manually triggered by a remote operator or an occupant of the autonomous vehicle 102.

In one implementation, the calibration transform 216 is optimized continuously according to scan cycles. More particularly, the perception system 204 retrieves a first set of approximately concurrent LIDAR and color images 212 and 214 recorded by the LIDAR sensor 208 and the color camera 210 during a first scan cycle. The first LIDAR point cloud 212 is scanned for a first cluster of points 310 that fall approximately on the planar surface 110. The planar surface may be designated as the calibration surface 302 if minimum threshold is met. The minimum threshold may be a calibration distance range, a minimum surface area, a minimum quantity of points on the plane 110, a minimum quantity of point in the foreground 304, and a minimum quantity of points in the background 306, and/or the like. A last calibration transform 216 is leveraged to locate a region of the color image 214 that depicts the calibration surface 302.

In one implementation, a first calibration transform 216 for the LIDAR sensor 208 and the color camera 210 is optimized based on an edge or boundary between foreground content 304 and background content 306 depicted on the calibration surface 302 in the first LIDAR image 212 and color image 214. During a next scan cycle, the perception system 204 obtains a second set of approximately concurrent LIDAR and color images 212 and 214 recorded by the LIDAR sensor 208 and the color camera 210. The second LIDAR point cloud 212 is scanned for a second cluster of points 310 that fall approximately on a planar surface, which may be the same or different planar surface as the surface utilized for the calibration surface 302 during the first scan cycle. This planar surface may be designated as a second calibration surface 302 if it meets the minimum threshold. The first calibration transform 216 is leveraged to locate a region 320 of the color image 214 that depicts the second calibration surface 302 and deriving a second calibration transform 216 for the LIDAR sensor 208 and the color camera 210 based on an edge or boundary between foreground content 304 and the background content 306 depicted on the calibration surface 302 in the second LIDAR and color images 212 and 214. The perception system 204 can repeat this process during each scan cycle throughout operation of the autonomous vehicle 102.

Once optimized, the calibration transform 216 may be applied to subsequent sets of LIDAR and color images 212 and 214 recorded by the LIDAR sensor 208 and the camera 210 to compile into one composite image. The perception system 204 may apply perception techniques to the composite image to detect and track objects. The motion planner 218 may utilize the composite images or other information to implement path planning techniques to elect or define a next navigational action (e.g., a change in steering, accelerator, and/or brake position in the autonomous vehicle 102) for autonomous execution based on tracked objects and their trajectories.

As discussed herein, the calibration routine for the sensor system 202 may include calibration thresholds or other parameters for designating the surface 110 as the calibration surface 302 and otherwise for spatially calibrating the sensors 208 and 210. In one implementation, the minimum thresholds include a calibration distance range, which involves a target distance or target distance range between the surface 110 and the autonomous vehicle 102 (the LIDAR sensor 208) that the surface 110 meets to qualify as the calibration surface 302. The calibration distance range may include a short-range calibration distance (e.g., ten meters) from the autonomous vehicle 102 to qualify as the calibration surface 302 if the LIDAR sensor 208 and the color camera 210 have not yet been calibrated or not recently calibrated (e.g., within the past one hour). As described below, the calibration distance range may be increased as the LIDAR sensor 208 and the color camera 210 are calibrated at shorter calibration distance ranges to converge on the calibration transform 216 that yields high spatial accuracy over long distances (e.g., more than 80 meters from the autonomous vehicle 102) for the LIDAR sensor 208 and camera 210.

Other calibration may include, without limitation: a minimum surface area of the calibration surface 302 that falls in the fields of view of the LIDAR sensor 208 and color camera 210; a minimum quantity of points in a LIDAR point cloud 212 that fall on the calibration surface 302 (otherwise referred to as the cluster of points 310); a minimum quantity of points 314 that fall on the background area 306 of the calibration surface 302; a minimum quantity of points 316 that fall on the foreground area 304 of the calibration surface 302; and/or the like. For example, the perception system 204 can set a large minimum surface area (e.g., one square meter), a large minimum quantity of points (e.g., 200 points) depicting the calibration surface 302 in a LIDAR point cloud 212, a large number of points (e.g., 120 points) depicting the background content 306 of the calibration surface 302, and/or a large number of points (e.g., 80 points) depicting the foreground content 304 on the calibration surface 302 for an initial calibration routine. As the autonomous vehicle 102 executes calibration routines and refines the calibration transform 216 accordingly throughout operation, the autonomous vehicle 102 can reduce the minimum values and thus calibrate the LIDAR sensor 208 and the color camera 210 according to smaller calibration surfaces and/or calibration surfaces at greater distances from the autonomous vehicle 102.

In one implementation, to detect the calibration surface 302 in the depth map 212, the cluster of points 310 approximately intersecting a plane defined by the surface 110 in the field 106 is detected. Generally, after recording the LIDAR point cloud 212 during a scan cycle, the perception system 204 can implement plane detection or plane fitting techniques to isolate clusters of points that fall on or very near a plane that may therefore represent an approximately-planar surface in the field of view of the LIDAR sensor 208 during this scan cycle.

For example, the perception system 204 can: leverage a last calibration transform 216 for the LIDAR sensor 208 and the color camera 210 to project the field of view of the color camera 210 onto the LIDAR point cloud 212 and thus isolate a volume of interest in the LIDAR point cloud 212. The perception system 204 implements plane detection or plane fitting techniques to scan the volume of interest in the LIDAR point cloud 212 for a set of discrete clusters of points, each containing points that fall on or very near one discrete plane. The set of discrete clusters of points is ranked, for example using weighting: proportional to number of points per cluster; inversely proportional to average distance from the LIDAR sensor 208; proportional to a proximity of the center of the volume of interest; and/or inversely proportional to error between these points in a cluster and the corresponding plane. The perception system 204 selects a highest-ranked or highest-weighted cluster of points in the set and marks the corresponding approximately-planar surface in the LIDAR point cloud 212 as the cluster of points 310 for the calibration surface 302 for the current calibration routine. As herein, it will be appreciated that multiple calibration surfaces 302, such as the calibration surfaces corresponding to the top five highest-ranked clusters of points 310 or located in target segments of the volume of interest, may be designated and processed in parallel.

Taking the cluster of points 310, in one implementation, the perception system 204 isolates the first subset of points 314, in the cluster of points 310, representing the background color 306 on the surface 302. The first subset of points 314 contain intensity values within a first range. The second subset of points 316, in the cluster of points 310, representing the foreground color 304 on the surface 302, with the second subset of points 316 containing intensity values within a second range different from the first range. Stated differently, the perception system 204 distinguishes the second subset of points 316 that fall on the foreground content 304 on the calibration surface 302 (e.g., text, iconography, or other graphics) from the first subset of points 314 that fall on background content 306 on the calibration surface 302 (e.g., a background color or texture) based on intensity values stored in these points.

More particularly, background and foreground features of different colors, textures, or reflectivity on the calibration surface 302 may reflect different proportions of light projected onto these features by optical emitters in the LIDAR sensor 208 back to pixels in the LIDAR sensor 208. The second subset of points 316 in the LIDAR point cloud 212 that correspond to a first feature (e.g., a foreground feature) of one color, texture, or reflectivity (or a narrow range of colors, textures, or reflectivity) may therefore contain substantially similar color intensities. The first subset of points 314 in the LIDAR point cloud that correspond to a second feature (e.g., a background or a second foreground feature) of a different color, texture, or reflectivity (or a different narrow range of colors, textures, or reflectivity) may therefore contain substantially similar color intensities that are substantively different from intensities of the second subset of points 316.

As such, in one implementation, the perception system 204: calculates a histogram of intensity values of points in the cluster of points 310; and segments the cluster of points 310 into discrete groups 312, wherein each group contains pixels with intensity values that fall within a narrow range of intensity values (e.g., +/−1% light intensity) that differs significantly (e.g., by more than 10% light intensity) from each other group of points in the cluster 310. The perception system 204 isolates the first group of points 314 that spans a largest area on the calibration surface 302 or that contains a largest number of points and designates the first group of points 314 as representing background content 306 on the calibration surface 302. Similarly, the second group of points 316 that: spans a second largest area on the calibration surface 302; contains a second-largest number of points; contains points exhibiting a smallest intensity variance; and/or abuts the first group of points 314 may be isolated as the foreground content 304. The perception system 204 calculates a 2D boundary in the plane of the calibration surface 302 around the second group of points 316 or calculates a 2D edge in the plane of the calibration surface 302 between the first group of points 314 and the second group of points 316.

In another implementation, to detect the calibration surface 302 in the depth map 212, the perception system 204: projects intensity values for the cluster of points 310 into a 2D intensity image of the calibration surface 302; implements edge detection to delineate edges in the intensity image; isolates a largest contiguous area bounded by an edge in the intensity image and/or the perimeter of the calibration surface 302 (i.e., a background region); isolate a second-largest contiguous area bounded by an edge in the intensity image and falling inside, abutting the background region, and/or exhibiting a "sharpest" edge with the background region (i.e., a foreground region); and then aggregate the first set of points falling in this foreground region and aggregate the second set of points falling in this background region of the calibration surface 302.

It will be appreciated that the perception system 204 can also implement similar operations to isolate a third group of points according to similar parameters and calculate: a 2D boundary around the third group of points; a 2D edge between the first group and the third group of points; and/or a 2D edge between the second group and the third group of points. The perception system 204 can thus isolate multiple groups of points that represent discrete, contiguous regions on the calibration surface 302, with each of these regions exhibiting a substantially uniform color, texture, and/or reflectivity that differs from the color, texture, and/or reflectivity of each other region on the calibration surface 302. It will further be appreciated that the perception system 204 can implement any other method or technique to isolate points in the cluster 310 that correspond to visually-discrete regions on the calibration surface 302.

With respect to the color image 214, in one implementation, the perception system 204 detects the calibration surface 302 in the 2D color image 214 based on a position of the cluster of points 310 in the 3D depth map 212 and the calibration transform 216 for the 2D camera 210 and the 3D depth sensor 208. An edge between the background color 324 and the foreground color 322 in the 2D image 320 of the calibration surface 302 is isolated.

More particularly, the perception system 204 locates edges in the color image 214 that are analogous to the boundary around the calibration surface 302 and the boundary or edge between background content 306 and foreground content 304 on the calibration surface 302 in the LIDAR point cloud 212. In one implementation, the perception system 204: extracts the boundary around the calibration surface 302 from the LIDAR point cloud 212; extracts a boundary or edge between background and foreground content 304 and 306 on the calibration surface 302 from the LIDAR point cloud 212; and projects these depth domain boundaries or edges onto the concurrent color image 212 based on a last calibration transform 216 for the LIDAR sensor 208 and the color camera 210 to obtain the relationship 326. In this implementation, the perception system 204 implements edge detection or other computer vision techniques to scan small, narrow regions of the color domain image 320 around these projected depth domain boundaries or edges for analogous boundaries or edges in the color domain. If the perception system 204 succeeds in detecting these analogous boundaries or edges in the color domain, the perception system 204 may verify sharpness of these boundaries or edges in the color domain and generate the relationship image 326.

However, if the perception system 204 does not detect these analogous boundaries or edges in the color domain or if these analogous boundaries or edges are blurred in the color domain image 320, the perception system 204 may discard the foreground feature 304 on the calibration surface 302, select an alternate foreground feature on the calibration surface 302, and repeat the foregoing process for this alternate foreground surface. Additionally or alternatively, if the perception system 204 does not detect these analogous boundaries or edges in the color domain or if these analogous boundaries or edges are blurred in the color domain image 320, the perception system 204 may discard the calibration surface 302, select an alternate calibration surface in the LIDAR point cloud 212, and repeat the foregoing process for this alternate calibration surface until crisp boundaries or edges for an alternate calibration surface are identified in the color domain. It will be appreciated, however, that the perception system 204 can implement any other method or technique to isolate a boundary or edge between background and foreground content 306 and 304 and around background content 306 on a calibration surface 302 in the color image 214.

In optimizing the calibration transform 216, in one implementation, the perception system 204: projects the first set of points 314, in the cluster of points 310, outside of the edge between the background color 306 and the foreground color 304; and projects the second set of points 316 in the cluster of points 310, inside of the edge between the background color 306 and the foreground color 304. Generally, perception system 204 calculates calibration transform 316 that when applied to the LIDAR point cloud 212 recorded during the current scan cycle, aligns a boundary or edge between groups of points 312 representing foreground and background content 304 and 306 on the calibration surface 302 in the LIDAR point cloud 212 to an analogous boundary or edge in the color image 214 (or vice versa). The perception system 204 may store the calibration transform 216 and implement the calibration transform 216 to align concurrent LIDAR and color images 212 and 214 recorded by the LIDAR sensor 208 and the color camera 210 (e.g., including the current and subsequent pairs of LIDAR and color images) when merging 3D and 2D data into a composite image.

As described herein, the perception system 204 may utilize multiple calibration surfaces per set of corresponding LIDAR and color images 212 and 214. In one implementation, the perception system 204: identifies multiple calibration surfaces 302 in the LIDAR point cloud 212; isolates groups of points 312 that represent foreground and background content 304 and 306 on each of the calibration surfaces 302 in the LIDAR point cloud 212 based on intensity values stored in the points; and optimizes the calibration transform 216 that projects the groups of points 312 onto corresponding foreground and background areas 304 and 306 of these calibration surfaces 302 depicted in the concurrent color image 214.

For example, the perception system 204 may: calculate an intersection of fields of view of the LIDAR sensor 208 and the color camera 210 based on a last calibration transform 216; segment this intersection into multiple segments (e.g., a 3×9 grid array of segments); and project these segments into the LIDAR point cloud 212 recorded during the current scan cycle. For a first segment of the LIDAR point cloud, the perception system 204: identifies a largest discrete calibration surface 302 represented by a cluster of points in the first segment of the LIDAR point cloud 212; isolates groups of points 312 that represent foreground and background content 304 and 306 in the first segment of the LIDAR point cloud 212 based on intensity values stored in these points; and locates an edge or boundary between this foreground and background content 304 and 306 on the calibration surface 302 in the concurrent color image 214. The perception system 204 can repeat these operations for each other segment of the LIDAR point cloud 212 to generate a set of (e.g., up to 27) unique pairs of foreground/background point groups 314-316 in the depth domain and foreground/background boundaries 322-324 in the color domain for generating or otherwise analyzing the relationship 326.

In this example, the perception system 204 may: calculate a segment-specific calibration transform for each calibration surface 302 selected from the LIDAR point cloud 212 (e.g., up to 27 unique calibration transforms); and combine these segment-specific calibration transforms into one final calibration transform 216. For example, when combining these segment-specific calibration transforms into one final calibration transform 216, the perception system 204 can: assign greatest weight to a calibration transform corresponding to a calibration surface nearest the center of the color image 214 (i.e., nearest the center of the field of view of the color camera 210, which may exhibit a minimum optical distortion); and assign lowest weight to a calibration transform corresponding to a calibration surface furthest from the center of the color image 214 (i.e., furthest from the center of the field of view of the color camera 210, which may exhibit a maximum optical distortion).

In another implementation, the perception system 204 calculates one calibration transform 216 that, when applied to the LIDAR point cloud 212: projects a smallest number of points representing backgrounds 306 of these calibration surfaces 302 outside of their corresponding calibration surfaces 302 in the concurrent color image 214; projects a smallest number of points representing backgrounds 306 of these calibration surfaces 302 inside of foreground areas 304 on their corresponding calibration surfaces 302 in the concurrent color image 212; and projects a smallest number of points representing foregrounds 304 of these calibration surfaces 302 outside of foreground areas 304 on their corresponding calibration surfaces 302 in the concurrent color image 212. It will be appreciated, however, that the perception system 204 can implement any other method or technique to calculate the calibration transform 216 based on multiple calibration surfaces 302 depicted in the LIDAR point cloud 212 and the concurrent color image 214.

In connection with calibration convergence, in one implementation, the perception system 204 refine target characteristics for calibration surfaces 302, selects one or a set of calibration surfaces 302 in one LIDAR point cloud 212 based on these target characteristics, and refines the calibration transform 216 for the LIDAR sensor 208 and the color camera 210 accordingly over time.

For example, after executing a first calibration routine to calculate a first calibration transform based on a first set of calibration surfaces that fulfill a first set of target characteristics during a current scan cycle, the perception system 204 can: increase the calibration distance (e.g., from ten meters to twenty meters); select a second calibration surface 302 in the LIDAR point cloud 212 that falls near this revised calibration distance and that falls within this revised intersection of the fields of view of the LIDAR sensor 208 and the color camera 210; and execute the foregoing operations to optimize the calibration transform 216 between the LIDAR sensor 208 and the color camera 210. The perception system 204 can further repeat this process up to a maximum calibration distance (e.g., from ten meters to twenty meters, then 40 meters, then 80 meters) or until no viable calibration surface is present or distinguishable in a next LIDAR point cloud 212 at the next calibration distance.

Additionally or alternatively, the perception system 204 can implement similar operations to calculate and refine the calibration transform 216 based on successively smaller calibration surfaces 302 represented in the LIDAR point cloud 212, such as: objects represented by clusters of more than 400 points in the LIDAR point cloud 212 (or "optically large" objects) during a first calibration routine; objects represented by clusters of between 200 and 400 points in the LIDAR point cloud 212 during a second calibration routine; objects represented by clusters of between 100 and 200 points in the LIDAR point cloud 212 during a third calibration routine; objects represented by clusters of between 50 and 100 points in the LIDAR point cloud 212 during a fourth calibration routine; and then objects represented by clusters of between 20 and 50 points in the LIDAR point cloud 212 (or "optically small" objects) during a fifth calibration routine, all within a current (i.e., one) scan cycle. The perception system 204 may implement similar operations to calibrate the 2D color camera 210 and the LIDAR sensor 208 based on the 2D color image 214 and a LIDAR point cloud 212 recorded during different scan cycles, as well.

Additionally, the perception system 204 can implement similar operations to calculate calibration transforms for one LIDAR sensor 208 and multiple cameras 210 arranged on the autonomous vehicle 102, wherein each of the cameras 210 defines a field of view that intersects the field of view of the LIDAR sensor 208.

Figure 4:
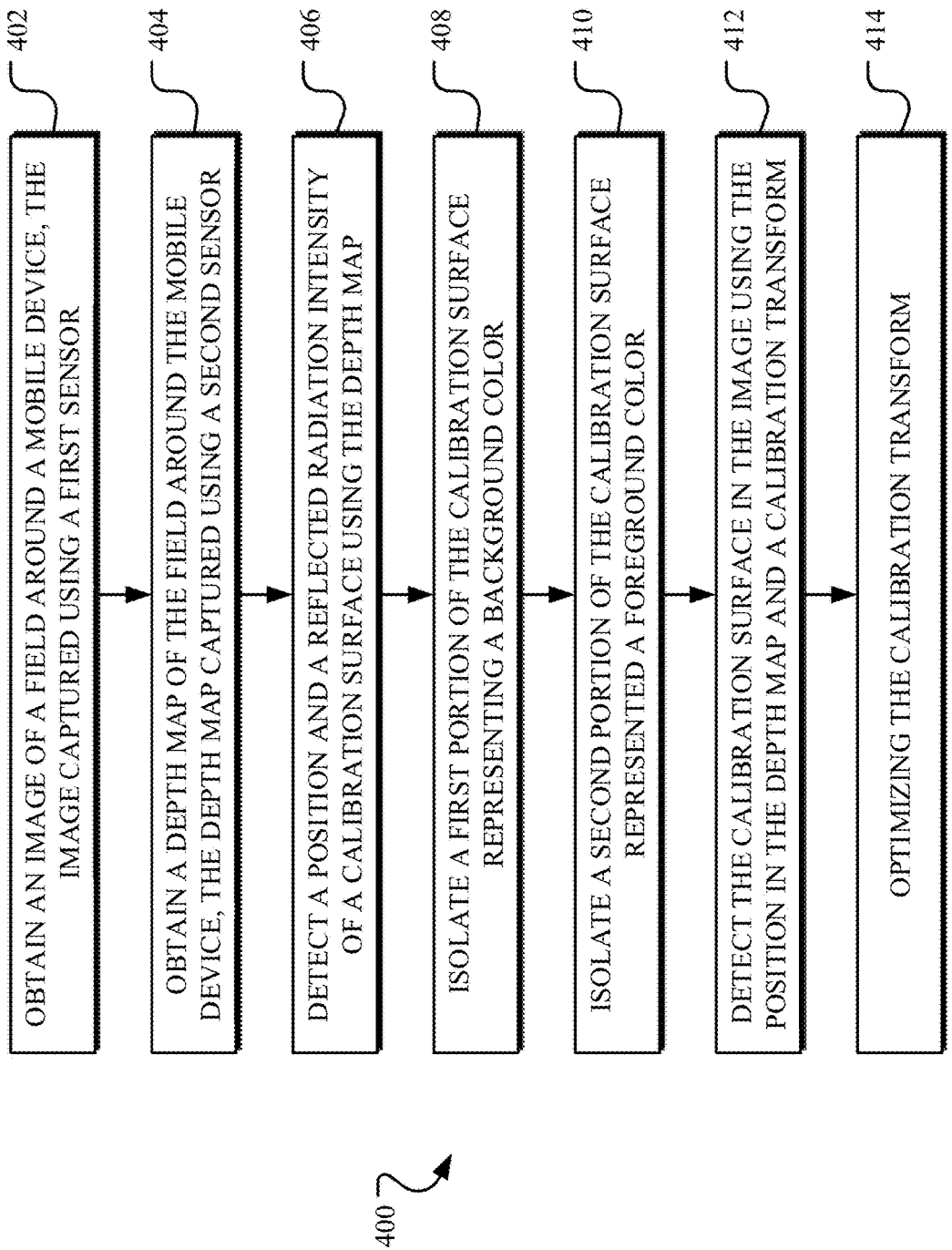
FIG. 4 illustrates example operations for sensor calibration.

Turning to FIG. 4, example operations 400 for sensor calibration are shown. In one implementation, an operation 402 obtains an image of a field around a mobile device, and an operation 404 obtains a depth map of the field around the mobile device. The image captured using a first sensor, and the depth map captured using a second sensor. The image may be a two dimensional color image or a two dimensional grayscale image, and the depth map may be a three dimensional LIDAR image. In one implementation, the depth map includes a point cloud, with each point in the point cloud representing a point-surface in the field around the mobile device and being associated with a light intensity value representative of at least one of a color, texture, or reflectivity of the point-surface.

An operation 406 detects a position and a reflected radiation intensity of a calibration surface in the field using the depth map. The calibration surface may be detected in the depth map by detecting a cluster of points in the point cloud corresponding to a plane in a depth domain. An operation 408 isolates a first portion of the calibration surface representing a background color based on the reflected radiation intensity, and an operation 410 isolates a second portion of the calibration surface representing a foreground color based on the reflected radiation intensity. In one implementation, the first portion of the calibration surface and the second portion of the calibration surface are isolated by aggregating the cluster of points into a first subset of points and a second subset of points based on the light intensity values. The first subset of points correspond to a first light intensity range and the second subset of points correspond to a second light intensity range. The first subset of points may represent the background color, and the second subset of points may represent the foreground color.

An operation 412 detects the calibration surface in the image using the position of the calibration surface in the depth map and a calibration transform between the first sensor and the second sensor. In one implementation, the calibration surface in the image is detected by projecting a boundary of the cluster of points from the depth map onto the image. The calibration surface is isolated in the image by scanning a region of the image around the boundary in the image and an edge between the foreground color and the background color is detected in the image. The calibration surface may be selected in the depth map based on: a calibration distance range, a minimum surface area, a minimum quantity of points on a plane, a minimum quantity of point in the first portion, and/or a minimum quantity of points in the second portion.

An operation 414 optimizes the calibration transform between the first sensor and the second sensor based on an overlap of at least one of the foreground color or the background color between the depth map and the image. In one implementation, the calibration transform is optimized by projecting the first subset of points in the image outside of an edge between the background color and the foreground color based on the calibration transform and projecting the second subset of points in the image inside of the edge between the background color and the foreground color based on the calibration transform. A contiguous boundary around the foreground color is isolated in the image. The calibration transform may be optimized to project all points in the first subset of points inside the contiguous boundary in a color domain and no points in the second subset of points inside the contiguous boundary in the color domain. Alternatively or additionally, the calibration transform may be optimized to project the contiguous boundary from a color domain into the depth domain, such that the contiguous boundary projected in the depth map contains all points in the first subset of points and excludes all points in the second subset of points.

The mobile device may be an autonomous vehicle, with the first sensor and the second sensor each deployed on the autonomous vehicle, and the calibration transform between the first sensor and the second sensor may be optimized in connection with an operation of the autonomous vehicle.

In some implementations, a composite image may be from a compilation of one or more images and one or more depth maps based on the calibration transform, with the one or more images include the image captured by the first sensor and the one or more depth maps including the depth map captured by the second sensor. One or more objects in the field around the mobile device may be perceived based on the composite image. Additionally, a navigation path through the field around the mobile device may be generated based on the one or more objects.

Figure 5:
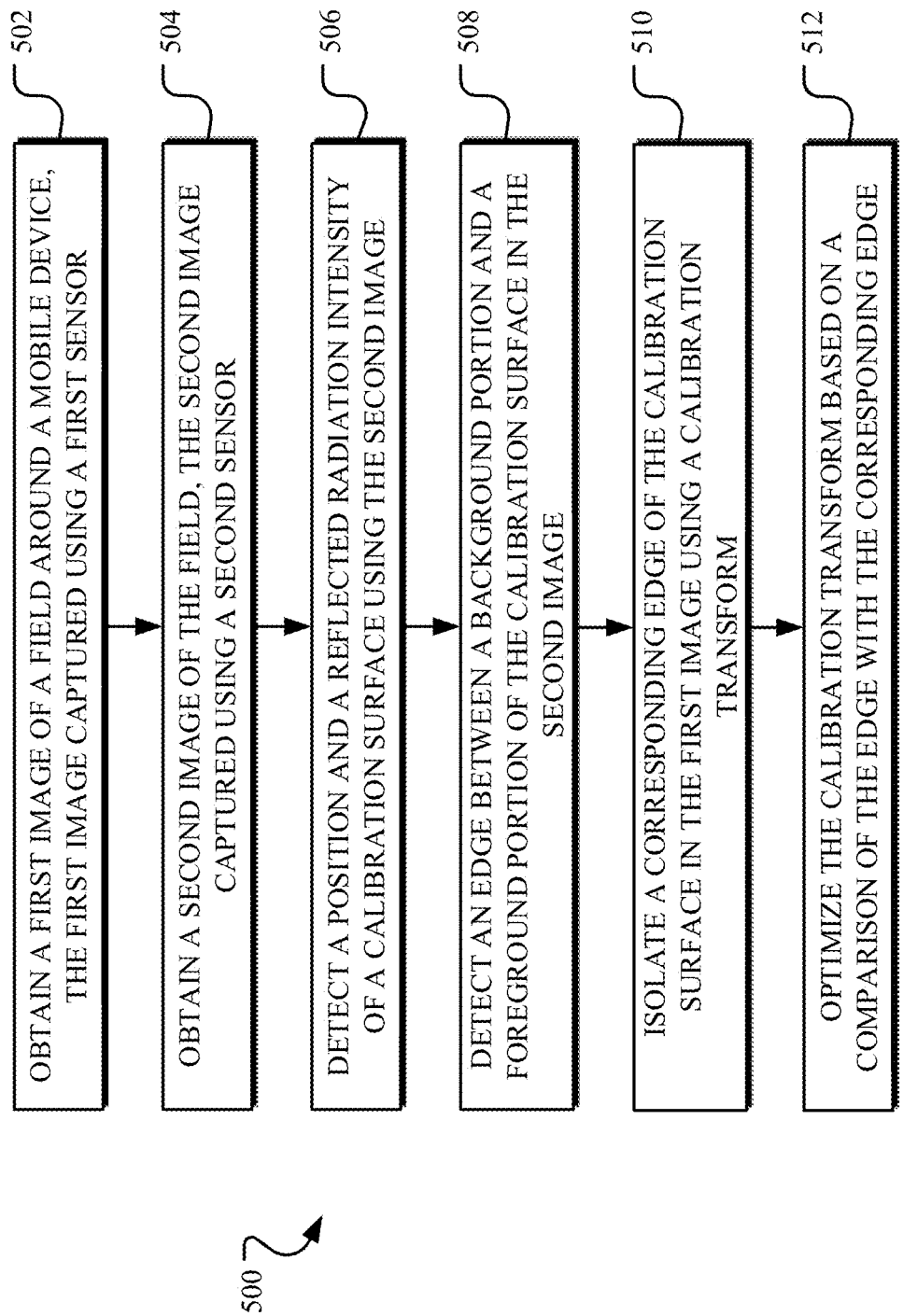
FIG. 5 illustrates example operations for sensor calibration.

Referring to FIG. 5, example operations 500 for sensor calibration are shown. In one implementation, an operation 502 obtains a first image of a field around a device, which may be a mobile or static device. The first image is captured with a first sensor. An operation 504 obtains a second image of the field, with the second image captured with a second sensor. In one implementation, the first image is a two dimensional color image or a two dimensional grayscale image and the second image is a three dimensional depth map.

An operation 506 detects a reflected radiation intensity of a calibration surface in the field using the second image. The calibration surface has a background portion and a foreground portion. In one implementation, the calibration surface is selected in the second image based on: a calibration distance range, a minimum surface area, a minimum quantity of points on a plane, a minimum quantity of point in the first portion, and/or a minimum quantity of points in the second portion. An operation 508 detects an edge between the background portion and the foreground portion of the calibration surface in the second image using the reflected radiation intensity, and an operation 510 isolates a corresponding edge between the background portion and the foreground portion of the calibration surface in the first image using a calibration transform between the first sensor and the second sensor. An operation 512 optimizes the calibration transform between the first sensor and the second sensor based on a comparison of the edge with the corresponding edge.

Figure 6:
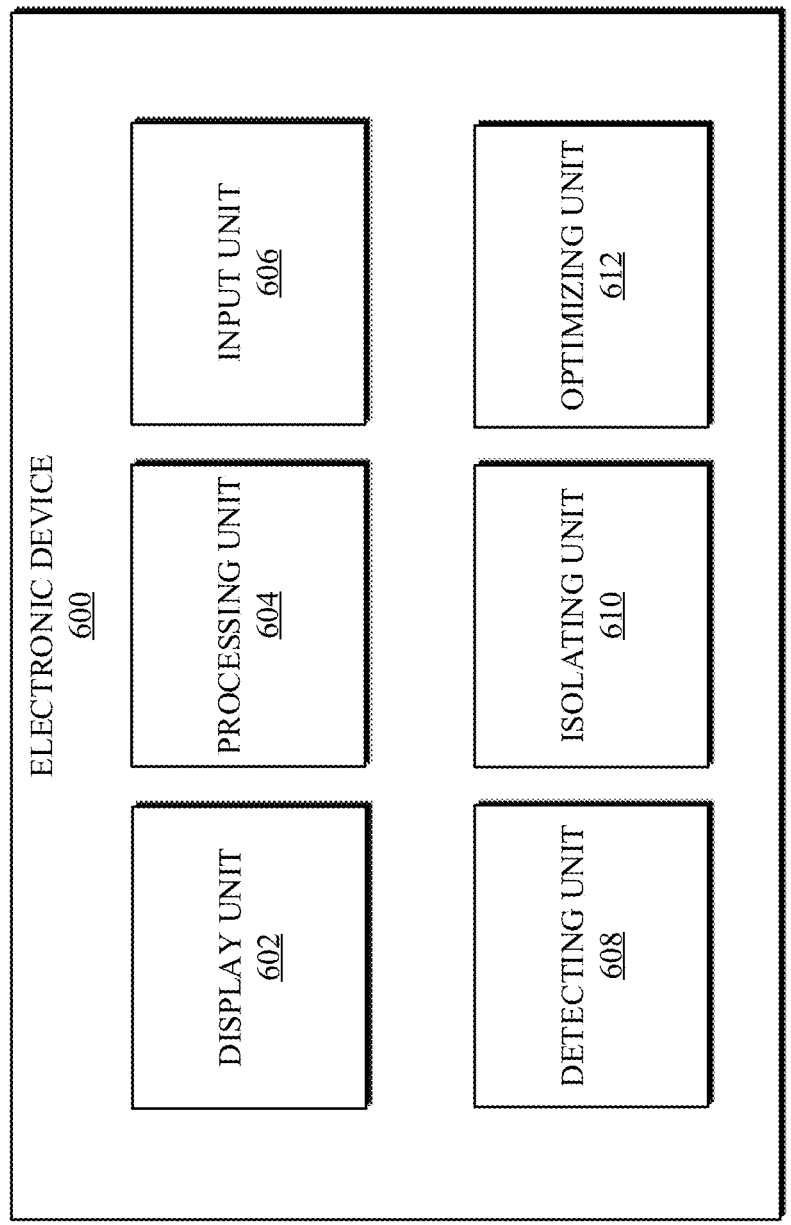
FIG. 6 is a functional block diagram of an electronic device including operational units arranged to perform various operations of the presently disclosed technology.

Turning to FIG. 6, an electronic device 600 including operational units 602-612 arranged to perform various operations of the presently disclosed technology is shown. The operational units 602-612 of the device 600 are implemented by hardware or a combination of hardware and software to carry out the principles of the present disclosure. It will be understood by persons of skill in the art that the operational units 602-612 described in FIG. 6 may be combined or separated into sub-blocks to implement the principles of the present disclosure. Therefore, the description herein supports any possible combination or separation or further definition of the operational units 602-612.

In one implementation, the electronic device 600 includes a display unit 602 configured to display information, such as a graphical user interface, and a processing unit 604 in communication with the display unit 602 and an input unit 606 configured to receive data from one or more input devices or systems. Various operations described herein may be implemented by the processing unit 604 using data received by the input unit 606 to output information for display using the display unit 602.

Additionally, in one implementation, the electronic device 600 includes units implementing the operations described with respect to FIG. 4. For example, the operations 502-504 may be implemented by the input unit 606, the operations 506-508 may be implemented by a detecting unit 608, and the operation 510 may be implemented with an isolating unit 610, and the operation 510 may be implemented with an optimizing unit 612. Other operations involving object tracking, identification, classification, detection, and/or the like may be implemented with an object tracking unit 612. Each of these units may execute the corresponding operations with one or more computing units. In some implementations, a controlling unit implements various operations for controlling the operation of a vehicle based on the operations implemented by the units 602-612.

Figure 7:
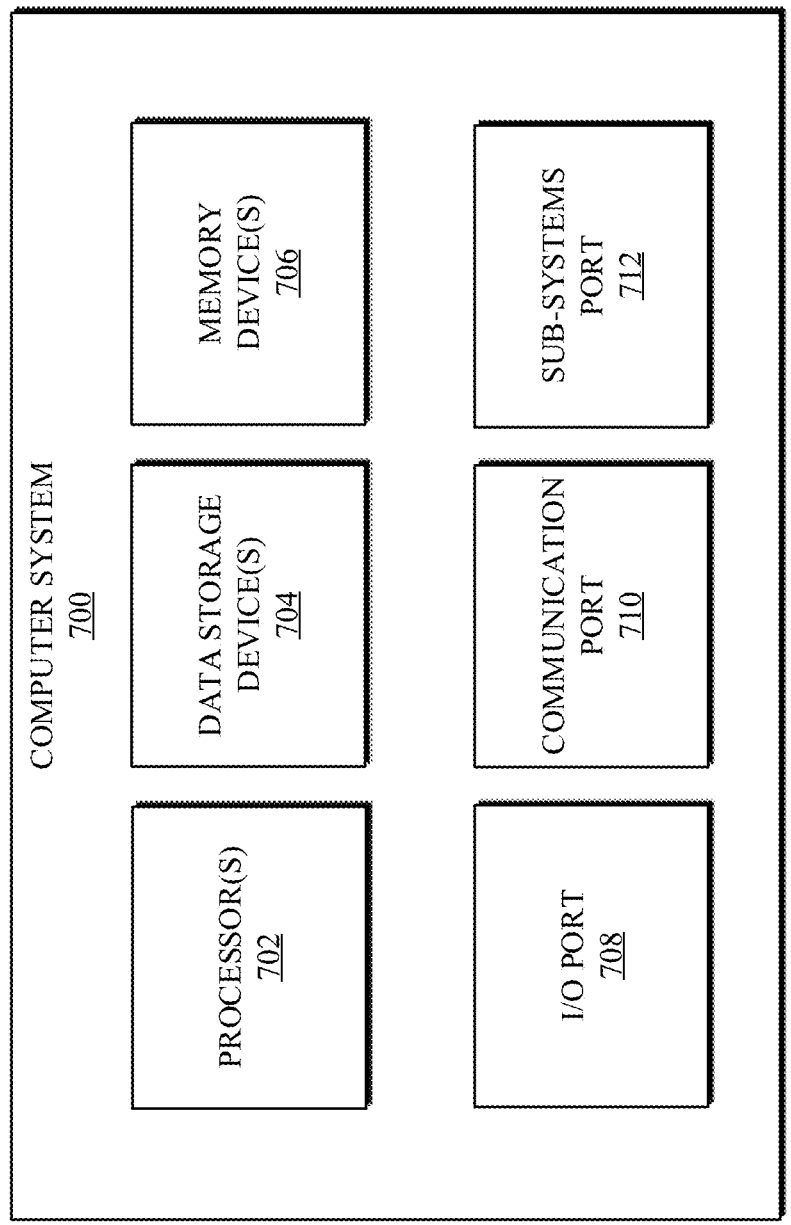
FIG. 7 is an example computing system that may implement various aspects of the presently disclosed technology.

Referring to FIG. 7, a detailed description of an example computing system 700 having one or more computing units that may implement various systems and methods discussed herein is provided. The computing system 700 may be applicable to the measuring system 102 and other computing or network devices. It will be appreciated that specific implementations of these devices may be of differing possible specific computing architectures not all of which are specifically discussed herein but will be understood by those of ordinary skill in the art.

The computer system 700 may be a computing system is capable of executing a computer program product to execute a computer process. Data and program files may be input to the computer system 700, which reads the files and executes the programs therein. Some of the elements of the computer system 700 are shown in FIG. 7, including one or more hardware processors 702, one or more data storage devices 704, one or more memory devices 706, and/or one or more ports 708-712. Additionally, other elements that will be recognized by those skilled in the art may be included in the computing system 700 but are not explicitly depicted in FIG. 7 or discussed further herein. Various elements of the computer system 700 may communicate with one another by way of one or more communication buses, point-to-point communication paths, or other communication means not explicitly depicted in FIG. 7.

The processor 702 may include, for example, a central processing unit (CPU), a microprocessor, a microcontroller, a digital signal processor (DSP), and/or one or more internal levels of cache. There may be one or more processors 702, such that the processor 702 comprises a single central-processing unit, or a plurality of processing units capable of executing instructions and performing operations in parallel with each other, commonly referred to as a parallel processing environment.

The computer system 700 may be a conventional computer, a distributed computer, or any other type of computer, such as one or more external computers made available via a cloud computing architecture. The presently described technology is optionally implemented in software stored on the data stored device(s) 704, stored on the memory device (s) 706, and/or communicated via one or more of the ports 708-712, thereby transforming the computer system 700 in FIG. 7 to a special purpose machine for implementing the operations described herein. Examples of the computer system 700 include personal computers, terminals, workstations, mobile phones, tablets, laptops, personal computers, multimedia consoles, gaming consoles, set top boxes, and the like.

The one or more data storage devices 704 may include any non-volatile data storage device capable of storing data generated or employed within the computing system 700, such as computer executable instructions for performing a computer process, which may include instructions of both application programs and an operating system (OS) that manages the various components of the computing system 700. The data storage devices 704 may include, without limitation, magnetic disk drives, optical disk drives, solid state drives (SSDs), flash drives, and the like. The data storage devices 704 may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 706 may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in the data storage devices 704 and/or the memory devices 706, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

In some implementations, the computer system 700 includes one or more ports, such as an input/output (I/O) port 708, a communication port 710, and a sub-systems port 712, for communicating with other computing, network, or vehicle devices. It will be appreciated that the ports 708-712 may be combined or separate and that more or fewer ports may be included in the computer system 700.

The I/O port 708 may be connected to an I/O device, or other device, by which information is input to or output from the computing system 700. Such I/O devices may include, without limitation, one or more input devices, output devices, and/or environment transducer devices.

In one implementation, the input devices convert a human-generated signal, such as, human voice, physical movement, physical touch or pressure, and/or the like, into electrical signals as input data into the computing system 700 via the I/O port 708. Similarly, the output devices may convert electrical signals received from computing system 700 via the I/O port 708 into signals that may be sensed as output by a human, such as sound, light, and/or touch. The input device may be an alphanumeric input device, including alphanumeric and other keys for communicating information and/or command selections to the processor 702 via the I/O port 708. The input device may be another type of user input device including, but not limited to: direction and selection control devices, such as a mouse, a trackball, cursor direction keys, a joystick, and/or a wheel; one or more sensors, such as a camera, a microphone, a positional sensor, an orientation sensor, a gravitational sensor, an inertial sensor, and/or an accelerometer; and/or a touch-sensitive display screen ("touchscreen"). The output devices may include, without limitation, a display, a touchscreen, a speaker, a tactile and/or haptic output device, and/or the like. In some implementations, the input device and the output device may be the same device, for example, in the case of a touchscreen.

The environment transducer devices convert one form of energy or signal into another for input into or output from the computing system 700 via the I/O port 708. For example, an electrical signal generated within the computing system 700 may be converted to another type of signal, and/or vice-versa. In one implementation, the environment transducer devices sense characteristics or aspects of an environment local to or remote from the computing device 700, such as, light, sound, temperature, pressure, magnetic field, electric field, chemical properties, physical movement, orientation, acceleration, gravity, and/or the like. Further, the environment transducer devices may generate signals to impose some effect on the environment either local to or remote from the example computing device 700, such as, physical movement of some object (e.g., a mechanical actuator), heating or cooling of a substance, adding a chemical substance, and/or the like.

In one implementation, a communication port 710 is connected to a network by way of which the computer system 700 may receive network data useful in executing the methods and systems set out herein as well as transmitting information and network configuration changes determined thereby. Stated differently, the communication port 710 connects the computer system 700 to one or more communication interface devices configured to transmit and/or receive information between the computing system 700 and other devices by way of one or more wired or wireless communication networks or connections. Examples of such networks or connections include, without limitation, Universal Serial Bus (USB), Ethernet, Wi-Fi, Bluetooth®, Near Field Communication (NFC), Long-Term Evolution (LTE), and so on. One or more such communication interface devices may be utilized via the communication port 710 to communicate one or more other machines, either directly over a point-to-point communication path, over a wide area network (WAN) (e.g., the Internet), over a local area network (LAN), over a cellular (e.g., third generation (3G), fourth generation (4G) network, or fifth generation (5G)), network, or over another communication means. Further, the communication port 710 may communicate with an antenna for electromagnetic signal transmission and/or reception. In some examples, an antenna may be employed to receive Global Positioning System (GPS) data to facilitate determination of a location of a machine, vehicle, or another device.

The computer system 700 may include a sub-systems port 712 for communicating with one or more systems related to a vehicle to control an operation of the vehicle and/or exchange information between the computer system 700 and one or more sub-systems of the vehicle. Examples of such sub-systems of a vehicle, include, without limitation, imaging systems, radar, LIDAR, motor controllers and systems, battery control, fuel cell or other energy storage systems or controls in the case of such vehicles with hybrid or electric motor systems, autonomous or semi-autonomous processors and controllers, steering systems, brake systems, light systems, navigation systems, environment controls, entertainment systems, and the like.

In an example implementation, images, perceptions, depth maps, sensor calibrations, motion plans, and software and other modules and services may be embodied by instructions stored on the data storage devices 704 and/or the memory devices 706 and executed by the processor 702. The computer system 700 may be integrated with or otherwise form part of a vehicle. In some instances, the computer system 700 is a portable device that may be in communication and working in conjunction with various systems or sub-systems of a vehicle.

The present disclosure recognizes that the use of such information may be used to the benefit of users. For example, the location information of a vehicle may be used to provide targeted information concerning a "best" path or route to the vehicle and to avoid objects and navigate through a field of view. Accordingly, use of such information enables calculated control of an autonomous vehicle. Further, other uses for location information that benefit a user of the vehicle are also contemplated by the present disclosure.

Users can selectively block use of, or access to, personal data, such as location information. A system incorporating some or all of the technologies described herein can include hardware and/or software that prevents or blocks access to such personal data. For example, the system can allow users to "opt in" or "opt out" of participation in the collection of personal data or portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses and not share or sell the data outside of those legitimate uses. Such collection should occur only after receiving the users' informed consent. Furthermore, third parties can evaluate these entities to certify their adherence to established privacy policies and practices.

The system set forth in FIG. 7 is but one possible example of a computer system that may employ or be configured in accordance with aspects of the present disclosure. It will be appreciated that other non-transitory tangible computer-readable storage media storing computer-executable instructions for implementing the presently disclosed technology on a computing system may be utilized.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a non-transitory machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium, optical storage medium; magneto-optical storage medium, read only memory (ROM); random access memory (RAM); erasable programmable memory (e.g., EPROM and EEPROM); flash memory; or other types of medium suitable for storing electronic instructions.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for sensor calibration, the method comprising:
   obtaining an image of a field external to a mobile device, the image captured using a first sensor;
   obtaining a depth map of the field external to the mobile device, the depth map captured using a second sensor;
   detecting a position and a reflected radiation intensity of a calibration surface in the field using the depth map;
   isolating a first portion of the calibration surface representing a background color based on the reflected radiation intensity;
   isolating a second portion of the calibration surface representing a foreground color based on the reflected radiation intensity;
   detecting the calibration surface in the image using the position of the calibration surface in the depth map and a calibration transform between the first sensor and the second sensor; and
   optimizing the calibration transform between the first sensor and the second sensor based on an overlap of at least one of the foreground color or the background color between the depth map and the image.

2. The method of claim 1, wherein the depth map includes a point cloud, with each point in the point cloud representing a point-surface in the field external to the mobile device and being associated with a light intensity value representative of at least one of a color, texture, or reflectivity of the point-surface.

3. The method of claim 2, wherein the calibration surface is detected in the depth map by detecting a cluster of points in the point cloud corresponding to a plane in a depth domain.

4. The method of claim 3, wherein the first portion of the calibration surface and the second portion of the calibration surface are isolated by aggregating the cluster of points into a first subset of points and a second subset of points based on the light intensity values, the first subset of points corresponding to a first light intensity range and the second subset of points corresponding to a second light intensity range, the first subset of points representing the background color and the second subset of points representing the foreground color.

5. The method of claim 4, wherein the calibration surface in the image is detected by:
   projecting a boundary of the cluster of points from the depth map onto the image;
   isolating the calibration surface in the image by scanning a region of the image around the boundary in the image; and
   detecting an edge between the foreground color and the background color in the image.

6. The method of claim 5, wherein the calibration transform is optimized by:
   projecting the first subset of points in the image outside of the edge between the background color and the foreground color based on the calibration transform;
   projecting the second subset of points in the image inside of the edge between the background color and the foreground color based on the calibration transform; and
   isolating a contiguous boundary around the foreground color in the image.

7. The method of claim 6, wherein the calibration transform is optimized to project all points in the first subset of points inside the contiguous boundary in a color domain and no points in the second subset of points inside the contiguous boundary in the color domain.

8. The method of claim 6, wherein the calibration transform is optimized to project the contiguous boundary from a color domain into the depth domain, such that the contiguous boundary projected in the depth map contains all points in the first subset of points and excludes all points in the second subset of points.

9. The method of claim 1, wherein the image is a two dimensional image and the depth map is a three dimensional LIDAR image.

10. The method of claim 1, wherein the mobile device is an autonomous vehicle, the first sensor and the second sensor each deployed on the autonomous vehicle, the calibration transform between the first sensor and the second sensor being optimized in connection with an operation of the autonomous vehicle.

11. The method of claim 1, further comprising:
generating a composite image from a compilation of one or more images and one or more depth maps based on the calibration transform, the one or more images include the image captured by the first sensor, and the one or more depth maps including the depth map captured by the second sensor; and
perceiving one or more objects in the field external to the mobile device based on the composite image.

12. The method of claim 11, further comprising:
generating a navigation path through the field external to the mobile device based on the one or more objects.

13. The method of claim 1, wherein the calibration surface is selected in the depth map based on one or more of: a calibration distance range, a minimum surface area, a minimum quantity of points on a plane, a minimum quantity of point in the first portion, and a minimum quantity of points in the second portion.

14. One or more non-transitory computer-readable storage media storing computer-executable instructions for performing a computer process on a computing system, the computer process comprising:
obtaining a first image of a field a device, the first image captured with a first sensor;
obtaining a second image of the field external to the device, the second image captured with a second sensor;
detecting a reflected radiation intensity of a calibration surface in the field using the second image, the calibration surface having a background portion and a foreground portion;
detecting an edge between the background portion and the foreground portion of the calibration surface in the second image using the reflected radiation intensity;
isolating a corresponding edge between the background portion and the foreground portion of the calibration surface in the first image using a calibration transform between the first sensor and the second sensor; and
optimizing the calibration transform between the first sensor and the second sensor based on a comparison of the edge with the corresponding edge.

15. The one or more non-transitory computer-readable storage media of claim 14, wherein the first image is a two dimensional color image or a two dimensional grayscale image and the second image is a three dimensional depth map.

16. The one or more non-transitory computer-readable storage media of claim 14, the calibration surface is selected in the second image based on one or more of: a calibration distance range, a minimum surface area, a minimum quantity of points on a plane, a minimum quantity of point in the first portion, and a minimum quantity of points in the second portion.

17. A system for sensor calibration, the system comprising:
a first sensor associated with a mobile device, the first sensor capturing a first image of a field external to the mobile device;
a second sensor associated with the mobile device, the second sensor capturing a second image of the field external to the mobile device; and
a perception system spatially calibrating the first sensor and the second sensor using a calibration transform, the calibration transform optimized by detecting an edge between a background portion and a foreground portion of a calibration surface in the second image and comparing the edge to a corresponding edge between the foreground portion and the background portion in the first image.

18. The system of claim 17, wherein the edge between the foreground portion and the background portion of the calibration surface in the second image is detected based on a light intensity values of a cluster of points.

19. The system of claim 17, wherein the first sensor is a camera and the second sensor is a LIDAR sensor.

20. The system of claim 17, wherein the calibration transform is triggered by least one of a remote operator system or an operator, the operator being a remote operator or an occupant of the mobile device.

* * * * *